US008493566B2

(12) United States Patent
Gutty et al.

(10) Patent No.: US 8,493,566 B2
(45) Date of Patent: Jul. 23, 2013

(54) METHOD FOR POSITIONING THE MIRRORS OF A TRIPLE AXIS LASER GYROMETER, IN PARTICULAR WHEN STARTING THE GYROMETER

(75) Inventors: François Gutty, Palaiseau (FR); Elienne Bonnaudet, Haut Fontaine (FR); Patrick Vauzelle, Cenon sur Vienne (FR); Laurent Thibaudeau, Poitiers (FR); Catherine Michèle Bonnaudet, legal representative, Saint-Georges-les-Baillargeaux (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/919,980

(22) PCT Filed: Feb. 11, 2009

(86) PCT No.: PCT/EP2009/051566
§ 371 (c)(1),
(2), (4) Date: Jan. 24, 2011

(87) PCT Pub. No.: WO2009/101105
PCT Pub. Date: Aug. 20, 2009

(65) Prior Publication Data
US 2011/0116097 A1    May 19, 2011

(30) Foreign Application Priority Data

Feb. 15, 2008   (FR) ...................................... 08 00837

(51) Int. Cl.
*G01C 19/68* (2006.01)
(52) U.S. Cl.
USPC ........................................................ 356/473

(58) Field of Classification Search
USPC ......................................................... 356/473
See application file for complete search history.

(56) References Cited

U.S. PATENT DOCUMENTS

| 4,616,929 | A |   | 10/1986 | Bernelin et al. |
| 4,755,057 | A |   | 7/1988 | Curby et al. |
| 4,762,415 | A |   | 8/1988 | Geen et al. |
| 4,839,903 | A | * | 6/1989 | Simms et al. ................... 372/94 |
| 5,357,338 | A |   | 10/1994 | Hutchings |
| 5,450,198 | A |   | 9/1995 | Killpatrick et al. |
| 5,940,179 | A | * | 8/1999 | Jaulain et al. ................. 356/471 |
| 6,069,699 | A | * | 5/2000 | Hemery et al. ............... 356/459 |
| 7,511,821 | B2 | * | 3/2009 | Bonnaudet et al. ........... 356/471 |

FOREIGN PATENT DOCUMENTS

FR    2 512 198 A1    3/1983

* cited by examiner

*Primary Examiner* — Tarifur Chowdhury
*Assistant Examiner* — Sunghee Y Gray
(74) *Attorney, Agent, or Firm* — Baker & Hostetler, LLP

(57) ABSTRACT

A method and an apparatus to position translatable mirrors in a laser gyrometer device is provided. For example, the method includes prepositioning three mirrors at an initial triplet of predetermined respective positions, simultaneously moving in translation the three mirrors within ranges having an amplitude that is lower than or equal to an intermode of an optical cavity, to ensure that the amplification medium provides a maximum gain. The intensities of the laser waves flowing respectively through each of the optical cavities are measured for each triplet of positions. The method includes determining, from the three triplets of mirror positions, the length of each of the three cavities at which the cavity provides a maximum intensity. The method includes determining a single final triplet of mirror positions for simultaneously imparting to the three lengths at which they provide a maximum intensity. The method includes positioning the mirrors according to the final position triplet.

7 Claims, 9 Drawing Sheets

METHOD FOR POSITIONING THE MIRRORS OF A TRIPLE AXIS LASER GYROMETER, IN PARTICULAR WHEN STARTING THE GYROMETER

CROSS-REFERENCE TO RELATED APPLICATIONS

This application is a National Stage of International patent application PCT/EP2009/051566, filed on Feb. 11, 2009, which claims priority to foreign French patent application No. FR 08 00837, filed on Feb. 15, 2008, the disclosures of which are incorporated by reference in their entirety.

FIELD OF THE INVENTION

The present invention relates to a method for positioning mobile mirrors in a device comprising laser cavities, the power of the laser waves traveling through the cavities depending on the positions of the mirrors. It applies for example to the starting of a laser gyrometer, in particular a gyrometer with three axes.

BACKGROUND OF THE INVENTION

A gyrometer is a sensor for measuring an angular velocity. For example, an inertial center uses three gyrometers and three accelerometers in order to fully determine the movement of the carrier at each instant, and thus reconstruct its displacement. A monoaxial laser gyrometer makes it possible to measure an angular velocity about a single axis. It comprises a laser ring cavity in which two beams propagate in opposite directions. It also comprises a readout system. When the cavity is set in rotation at a velocity $\Omega$, owing to the Sagnac effect the beams see their optical frequencies differ by a quantity proportional to $\Omega$. The device which makes it possible to measure this frequency difference constitutes the readout system. The laser ring cavity consists of an optical ring cavity, an output coupler for the laser beams and an optical amplifier medium with a system for supplying it. Through the optical ring cavity, formed by at least three mirrors providing a closed path, beams can travel in opposite directions. When the cavity is planar, the direction of the sensitive axis of the gyrometer is simply given by the normal to the plane. The perimeter of the optical cavity, given by the sum of the distances between the mirrors, is also referred to as the cavity length and denoted L. For example, four mirrors A, E, B and C may form a square optical ring cavity whose length is four times the side length AE. One wave may travel through this cavity in the clockwise direction from A to E and another wave in the counterclockwise direction from E to A. The output coupler, which makes it possible to extract a fraction of the intensity of the laser waves traveling through the cavity, conventionally consists of one of the mirrors which is slightly transmissive. The optical cavity also fulfils the function of a spectral filter: only the modes of the cavity—waves whose optical frequency is a multiple of c/L where c is the speed of light—can propagate in a loop therein. For cavities of conventional sizes, that is to say where L is less than 30 cm, the spectral interval c/L between two modes is more than one gigahertz (GHz). In laser gyrometers, the laser amplifier medium usually consists of a gas mixture of helium and neon at a low pressure, hermetically trapped in the cavity. The optical amplification is then generated over one or more segments of the cavity where the gas is ionized, for example with the aid of a discharge between an anode and a cathode. However, the gain is available only in certain optical frequency bands which are furthermore relatively narrow for a given gaseous amplifier medium, typically with a width of the order of one gigahertz. The laser effect is then obtained at the optical frequencies at which the gain in the amplifier medium is more than the losses experienced during propagation in the cavity and during reflection from its mirrors. In the case of a helium-neon mixture, one of the amplification bands lies in the visible range, in the vicinity of the wavelength 633 nanometers (nm). Conventionally, the mirrors are designed to be sufficiently reflective only in this range of optical frequencies, so that the laser effect is possible only in the vicinity of the wavelength 633 nm. With the orders of magnitude above, the cavity modes can become relatively distant from the maximum in the gain. When starting the gyrometer, the length L of the cavity must therefore be adjusted toward an optimal value in order to bring a mode to the maximum of the laser gain. During operation, however, the length L varies as a function of the thermal phenomena of expansion and contraction experienced by the gyrometer between two power-ups. If the length of the cavity is not adapted when powering up, the gyrometer does not fully benefit from the gain of the amplifier medium contained in the cavity.

One current solution for correcting this phenomenon is to use a translatable mirror, that is to say a mobile mirror which can be displaced while following a translation movement, and a mirror making it possible to sample a part of one of the two waves in order to measure its intensity. The adjustment of the mobile mirror is carried out by successive shifts while following a translation movement in the cavity. For each value of the shift, the intensity of the wave is measured. The aim is then to converge toward a shift value corresponding to the intensity maximum, this value corresponding to the maximum gain of the optical cavity, making it possible to benefit from the laser effect to the greatest extent. However, the convergence time when starting up such a gyrometer according to the prior art is often long, this being for various reasons. This is one of the technical problems which the present invention is intended to solve.

A first solution of the prior art consists in initially scanning the entire shift range of the mobile mirror from one end to the other while measuring the intensity of the emitted wave, then in subsequently returning to the shift value which allowed the greatest intensity to be measured. This solution, however, suffers from a hysteresis phenomenon: when returning to the shift value which corresponded to a maximum, certain characteristics will have changed and the maximum will no longer be quite there. An additional step is therefore necessary in order to converge smoothly toward the maximum.

A second solution of the prior art consists in scanning from a given position of the mobile mirror, this position being obtained from a table which collates external temperature conditions with positions of the mobile mirror and in stopping at the first maximum encountered. The table is generally provided by the manufacturer of the gyrometer for a given type of gyrometer. It collates with given conditions of external temperature a position of the mobile mirror capable of providing the maximum intensity or at least providing an intensity close to the maximum intensity. When the length L of the optical cavity is varied by shifting the mirror, however, the emitted wave does not only exhibit global or principal maxima at which its intensity actually reaches an upper limit; local or secondary maxima, at which the intensity is maximal only in the vicinity of one position may also arise in proximity to the minimum, leading to competition between two modes, one at the exit point on one side of the curve while the other enters on the opposite side. The mobile mirror may consequently first linger temporarily around a position corresponding to a secondary maximum, then only in a second step tend toward a position corresponding to a principal maximum. This phenomenon greatly lengthens the convergence time, entailing unavailability of the gyrometer.

Once the shift value corresponding to the gain maximum has been found, slaving is required in order to perform regular periodic shifts of the mobile mirror with a smaller amplitude and correct the thermal expansion/contraction phenomena experienced by the cavity. These shifts must make it possible to track the maximum by varying the position of the mobile mirror quasi-continuously. However, tracking a maximum by varying the position of the mobile mirror quasi-continuously is not easy to do. In the solutions of the prior art, notably, a so-called "mode hopping" phenomenon is frequently observed. Details of this phenomenon will be given below in the application. It is characterized by an abrupt shift of the mobile mirror and an abrupt variation in the frequency of the emitted wave. This is another of the technical problems which the present invention is intended to solve.

There are also triple axis or "triaxial" laser gyrometers comprising three optical cavities arranged orthogonally in pairs. Each of the three optical cavities adopts the operating principles described above for a monoaxial gyrometer in order to measure the angular velocity of the gyrometer about its sensitive axis. In these triple axis gyrometers, mobile mirrors are often shared between the cavities so that shifting one mobile mirror has an impact not on the length of only one cavity but on the lengths of two cavities. The prior art proposes applying one of the two prior art solutions described above, for making a monoaxial gyrometer converge when starting, independently to the three cavities of such a triple axis gyrometer. This initially involves successively determining for each of the three cavities the length which gives it the greatest intensity, using one of the prior art methods described above. Once the three lengths have been determined, it subsequently involves determining a triplet of positions of the mirrors which makes it possible to achieve the three cavity lengths simultaneously, this being done by an analytical method which will be described below. However, independently applying one of the two prior art solutions to the three cavities of a triple axis gyrometer will not take into account the irreproducibility of the cavities and therefore their differences in behavior. For instance, one cavity may track a principal maximum while another cavity may track a secondary maximum. It also goes without saying that the phenomena of hysteresis, delays induced by the secondary maxima and mode hopping are then commensurately more difficult to correct when they take place simultaneously in cavities whose lengths are interdependent. The convergence time of such a gyrometer with three cavities is therefore more difficult to control. This is another of the technical problems which the present invention is intended to solve.

SUMMARY OF THE INVENTION

It is notably an object of the invention, when starting a gyrometer, to minimize the time necessary for converging toward the maximum gain of the optical cavity of a monoaxial laser gyrometer or toward the maximum gain of the optical cavities of a triple axis laser gyrometer. To this end, the invention provides notably a starting sequence for a laser gyrometer comprising a phase of driving the mobile mirror or mirrors which improves the determination of the positioning of the mobile mirror or mirrors in the optical cavities. To this end, the invention relates to a method for positioning a translatable mirror in a laser cavity. The laser cavity comprises an optical amplifier medium which can be excited so as to generate light waves. The laser cavity also comprises an optical cavity formed by a set of mirrors including the translatable mirror, the length of the optical cavity depending on the position of the translatable mirror. The translatable mirror can be displaced in a range of positions imparting to the optical cavity lengths at which the amplifier medium generates at least one laser wave. The method comprises a phase of prepositioning the mirror at a predetermined initial position. The method also comprises a phase of displacing the mirror in translation in a range whose amplitude is equal to the intermode of the optical cavity, so as to ensure that the optical cavity passes through a length at which the gas offers a gain maximum, the intensity of the laser wave being measured for each position occupied by the mirror. The method also comprises a phase of positioning the mirror at a final position corresponding to the highest measurement of intensity.

Advantageously, the initial position of the mirror may be extracted from a table collating with temperature values a position of the mirror imparting to the optical cavity a length at which the amplifier medium offers a gain maximum at said temperature.

For example, the amplifier medium may be a gas which can be ionized by an electrical discharge in a laser gyrometer.

The method may comprise a preliminary phase of scanning the mirror in a range covering the displacement range of the mirror but without measuring the intensity of the wave, so as to reduce the hysteresis between the phase of displacing the mirror and the phase of positioning the mirror.

The invention also relates to a method for positioning three translatable mirrors in a device comprising three laser ring cavities. Each of the three laser cavities comprises an optical amplifier medium which can be excited so as to generate light waves. Each of the three laser cavities also comprises an optical cavity formed by a set of mirrors including two of the translatable mirrors, the length of said optical cavity depending on the position of said two translatable mirrors, said two translatable mirrors being displaceable in ranges of positions imparting to the optical cavity lengths at which the amplifier medium generates at least one laser wave. Each of the three translatable mirrors is used in the formation of two of the optical cavities. The method comprises a phase of prepositioning the three mirrors at an initial triplet of predetermined respective initial positions. The method also comprises a phase of displacing the three mirrors simultaneously in translation in ranges having an equal amplitude less than or equal to the intermode of the optical cavity having the highest intermode, so as to ensure that each of the optical cavities passes through a length at which the amplifier medium offers a gain. The intensities of the laser waves respectively traveling through each of the optical cavities are measured for each triplet of positions which are occupied by the mirrors. The method also comprises a phase of determining, on the basis of the three triplets of positions of the mirrors which respectively allowed each of the three cavities to offer a maximum intensity, the length of each of the three cavities at which said cavity provides a maximum intensity. The method also comprises a phase of determining a single final triplet of positions of the mirrors making it possible simultaneously to impart to the three cavities lengths at which they provide a maximum intensity. The method also comprises a phase of positioning the mirrors at the final triplet of positions.

Advantageously, the initial triplet of positions of the three mirrors may be extracted from a table collating with temperature values a triplet of positions of the three mirrors imparting respectively to each of the optical cavities a length at which the amplifier medium offers a gain maximum at said temperature.

For example, the amplifier media may be gases which can be ionized by an electrical discharge in a triple axis laser gyrometer.

The three optical cavities having an equal intermode, the displacement amplitude of the three mirrors may be equal to half said intermode.

The method may comprise a preliminary phase of scanning the three mirrors in ranges covering the displacement ranges of the mirror but without measuring the intensities of the wave, so as to reduce the hysteresis between the phase of displacing the mirrors and the phase of positioning the mirrors.

If the device comprises an adjustment mechanism making it possible, on the basis of the final triplet of positions, to constantly adjust the positions of the translatable mirrors so as to ensure that the cavities have respective lengths allowing them to constantly provide a maximum intensity, then the method may comprise a final phase of comparing the final triplet of positions with a triplet of positions toward which the adjustment mechanism makes the mirrors converge after a given delay, the preceding phases of the method being repeated and/or the difference being stored in memory and/or the device being disabled if one of the mirrors is further away than a given threshold from the position which it had at the end of the positioning phase.

The present invention also has the principal advantages that the initial positioning of the mirror or mirrors is no longer dependent on the operating frequency of the slaving system of the mirrors, this system being more suited to tracking the power maximum rather than finding it initially. This is because it operates in a "slow" frequency range of the order of one hertz. A system implementing the present invention in order to determine an initial position may operate in a "fast" frequency range of the order of one kilohertz.

BRIEF DESCRIPTION OF THE DRAWINGS

Other characteristics and advantages of the invention will become apparent from the following description provided with reference to the appended drawings, in which.

DETAILED DESCRIPTION

Figure 1A:
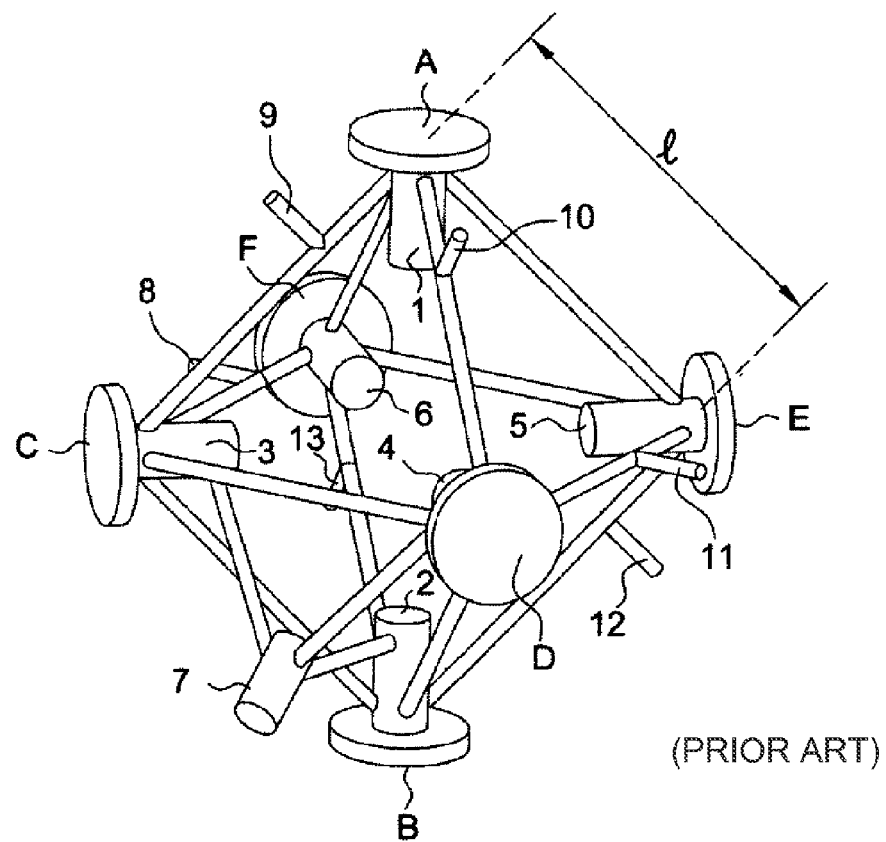
FIG. 1a represents by a perspective view an illustration of an example of optical cavities of a triple axis laser gyrometer according to the prior art.

FIG. 1a illustrates by a perspective view the three optical cavities of a triple axis gyrometer according to the prior art. The gyrometer comprises six mirrors A, B, C, D, E and F. The mirrors A, B, C, D, E and F are connected in pairs by optical paths AC, AD, AE, AF, BC, BD, BE, BF, CD, CF, ED and EF of equal length l, these optical paths allowing propagation of the light waves. Reserves 1, 2, 3, 4, 5 and 6 of amplifier gas are arranged against the mirrors A, B, C, D, E and F, respectively. The polyhedron formed by the six mirrors and the twelve optical paths is circumscribed by a cube, each of the mirrors coinciding with the center of a face of said cube. The device produced in this way comprises three closed optical paths ADBF, ACBE and FCDE respectively forming three optical ring cavities X, Y and Z of equal length L=4×l, which are orthogonal in pairs. For example, the mirrors B, C and D are translatable, i.e. they can be moved in translation. By virtue of a piezoelectric control, they can be moved away or toward the center of the polyhedron substantially by 1 micrometer. In this way, the respective lengths of the three optical cavities X, Y and Z can be adjusted around the value L with a precision of approximately 0.01 micrometer. It should be noted that the length of each of the optical cavities X, Y and Z depends on the position of two mobile mirrors among B, C and D. It should also be noted that the position of each of these mobile mirrors B, C and D conditions the length of two optical cavities among X, Y and Z. The mirrors A, E and F constitute the output couplers: they make the laser intensity measurements possible. In this way, the respective powers of the waves which travel through the three optical cavities X, Y and Z can be measured. A cathode 7, connected by three capillaries to the gas reserves 2, 3 and 4, and six anodes 8, 9, 10, 11, 12 and 13 make it possible to excite the amplifier gas in the optical cavities X, Y and Z and thus generate laser waves which travel through the optical cavities X, Y and Z. The three optical cavities X, Y and Z can be produced by initially hollowing out the optical paths LAC, AD, AE, AF, BC, BD, BE, BF, CD, CF, ED and EF in a block of material characterized by a controlled thermal expansion, for example the material Zérodur® which offers a very low thermal expansion. The mirrors A, B, C, D, E and F and the gas reserves 1, 2, 3, 4, 5 and 6 may then be integrated into the block.

Figure 1B:
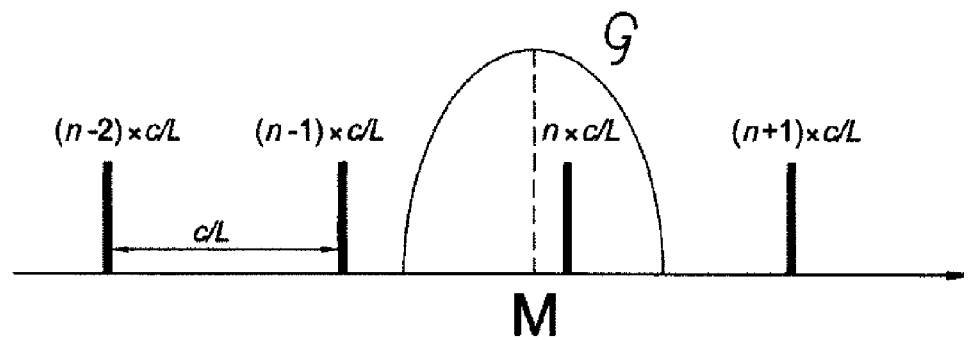
FIG. 1b represents by a graph an illustration of the laser modes of an optical cavity of a gyrometer according to the prior art.

FIG. 1b illustrates by a synoptic the laser modes of any one of the optical cavities X, Y or Z of the gyrometer in FIG. 1a. The abscissa axis represents the optical frequency. The length L of the optical cavity determines the frequencies of the laser modes which it can emit: this set of frequencies consists of a comb of frequencies which are a multiple of c/L, i.e. for example (m−2)×c/L, (m−1)×c/L, m×c/L and (m+1)×c/L, where m is an integer. When starting the gyrometer, the length of each cavity is adjusted in order to bring a mode as close as possible to the maximum M of the laser gain of the amplifier gas, the spectrum of the gain being represented by a parabolic curve G. In FIG. 1b, for example, it is the mode m corresponding to the frequency m×c/L which substantially lies at the maximum of the gain. After starting the gyrometer, the thermal changes over time due to the gas discharges or due to the external environment cause a mechanical deformation of the gyrometer by expansion/contraction. The lengths of the three laser cavities consequently tend to vary. However, as illustrated by the curve G, gaseous plasmas exhibit a gain with a small spectral width. The optical properties of the gyrometer are consequently also modified, and they are modified commensurately more when the separation of the mode m from the maximum M increases. In order to preserve its characteristics, the gyrometer must therefore implement an autonomous device referred to as "cavity length tuning" (CLT) which keeps the mode m as close as possible to the maximum M. In the case of a monoaxial laser gyrometer with a single laser cavity which contains a mobile mirror, a CLT device may for example be obtained with a photodiode measuring the emitted laser power and slaving electronics which control the mobile mirror in order to maintain a maximum emitted power. In the case of a triple axis laser gyrometer such as the one in FIG. 1a, the three cavities X, Y and Z share the mirrors 2 by 2, in particular the mirrors B, C and D. As a consequence, no one cavity can be tuned independently of the other two.

A mobile mirror generally consists of at least one membrane adhesively bonded to a transducer based on piezoelectric ceramics. Ceramics are usually controlled in positive and negative voltage, under the effect of which commands they are deformed while driving the membrane. The deformation of the membrane exerts a pushing or pulling mechanical stress on the center of the mirror. The mirror is thus displaced in one direction or the other while following a translation movement. In what follows, the commands will be considered in the form of voltages denoted $V_B$, $V_C$ and $V_D$ such that the displacements $L_B$, $L_C$ and $L_D$ of the mirrors B, C and D, respectively, are proportional to these voltages. Assuming that the three mobile mirrors have exactly the same characteristics, and therefore exactly the same mechanical behavior, this can be summarized by a single equation $L_{B,C,D} = G_{B,C,D} \times V_{B,C,D}$, where $G_{B,C,D}$ is the translation/electrical gain coefficient of the mirrors B, C and D. In reality, $G_{B,C,D}$ can be likened to coefficients $G_B$, $G_C$ and $G_D$ which may each be positive or negative depending on the design of the mobile mirror and whose values may also differ. In what follows, however, it will be assumed that the three mobile mirrors LB, C and D have a coefficient with the same sign and a comparable value, denoted G, which satisfies Equation 1 below:

$$L_{B,C,D} = G \times V_{B,C,D} \quad (1)$$

In what follows, the lengths of the cavities X, Y and Z when the mobile mirrors are at rest, that is to say when $V_{B,C,D}=0$, will be denoted $L_{X,Y,Z}^0$. The lengths $L_X$, $L_Y$ and $L_Z$ of the three cavities are related to the shifts of the mirrors $L_B$, $L_C$ and $L_D$ according to the system of $$\begin{cases} L_X = L_X^0 + L_D + L_B \\ L_Y = L_Y^0 + L_B + L_C \\ L_Z = L_Z^0 + L_C + L_D \end{cases}$$

equations, which reduces to the following matricial Equation 2:

$$\begin{pmatrix} L_X \\ L_Y \\ L_Z \end{pmatrix} = \begin{pmatrix} L_X^0 \\ L_Y^0 \\ L_Z^0 \end{pmatrix} + G \cdot \begin{pmatrix} 0 & 1 & 1 \\ 1 & 0 & 1 \\ 1 & 1 & 0 \end{pmatrix} \begin{pmatrix} V_C \\ V_D \\ V_B \end{pmatrix} \quad (2)$$

Conversely, in order to obtain cavities with lengths $L_X$, $L_Y$ and $L_Z$, the voltages to be supplied are expressed according to Equation 3 below:

$$\begin{bmatrix} V_C \\ V_D \\ V_B \end{bmatrix} = \frac{1}{2G} \begin{bmatrix} -1 & 1 & 1 \\ 1 & -1 & 1 \\ 1 & 1 & -1 \end{bmatrix} \left( \begin{bmatrix} L_X \\ L_Y \\ L_Z \end{bmatrix} - \begin{bmatrix} L_X^0 \\ L_Y^0 \\ L_Z^0 \end{bmatrix} \right) \quad (3)$$

For each cavity, the CLT determines the position $L_{X,Y,Z}$ of the current laser mode in relation to the position $L_{X,Y,Z}^{Max}$ corresponding to the gain maximum, and reacts in order to reduce the difference. For example, the choice may be made to implement modulation of the mobile mirrors and synchronous demodulation of the measured powers. A signal $S_{X,Y,Z}$ proportional to $L_{X,Y,Z} - L_{X,Y,Z}^{Max}$ is obtained, and a value integrated with respect to time $I_{X,Y,Z}(t) = \int_{t_0}^{t} S_{X,Y,Z}(u) du$ may be constructed.

The autonomous slaving may then be obtained by generating at the instant n+1 voltages $V_B$, $V_C$ and $V_D$ which are offset from those at the instant n, where n is an integer:

$$\begin{bmatrix} V_C \\ V_D \\ V_B \end{bmatrix}_{n+1} = \begin{bmatrix} V_C \\ V_D \\ V_B \end{bmatrix}_n - A \begin{bmatrix} -1 & 1 & 1 \\ 1 & -1 & 1 \\ 1 & 1 & -1 \end{bmatrix} \begin{bmatrix} S_X \\ S_Y \\ S_Z \end{bmatrix}$$

or, which is equivalent, by driving the mirrors with a voltage:

$$\begin{bmatrix} V_C \\ V_D \\ V_B \end{bmatrix} (t) = -A \begin{bmatrix} -1 & 1 & 1 \\ 1 & -1 & 1 \\ 1 & 1 & -1 \end{bmatrix} \begin{bmatrix} I_X \\ I_Y \\ I_Z \end{bmatrix} \quad (4)$$

where A denotes the gain coefficient between the integrated quantities $I_X$, $I_Y$ and $I_Z$ and the voltages $V_B$, $V_C$ and $V_D$.

The signals $S_X$, $S_Y$, $S_Z$, $I_X$, $I_Y$ and $I_Z$ may be sampled, and the mathematical operation carried out by software. The output commands are then obtained by amplifying the voltages generated by a digital-analog converter. It is also possible not to use conversion of these signals in order to carry out the operation by hardware. The output commands are then obtained by amplifying the voltages resulting from the hardware operation. In all cases, the device samples the values $I_X$, $I_Y$ and $I_Z$ in order to be able to monitor them.

Since the optical cavity supports a comb of laser modes separated in frequency by the quantity c/L, the laser power varies periodically as a function of L: the laser power passes through a maximum and a minimum each time L varies by an optical wavelength denoted λ. Furthermore, the length of each cavity varies with the commands $V_B$, $V_C$ and $V_D$. In the example selected, the variation is expressed according to:

$$\begin{cases} L_X = L_X^0 + G[V_D + V_B] \\ L_Y = L_Y^0 + G[V_B + V_C] \\ L_Z = L_Z^0 + G[V_C + V_D] \end{cases}$$

Figure 2:
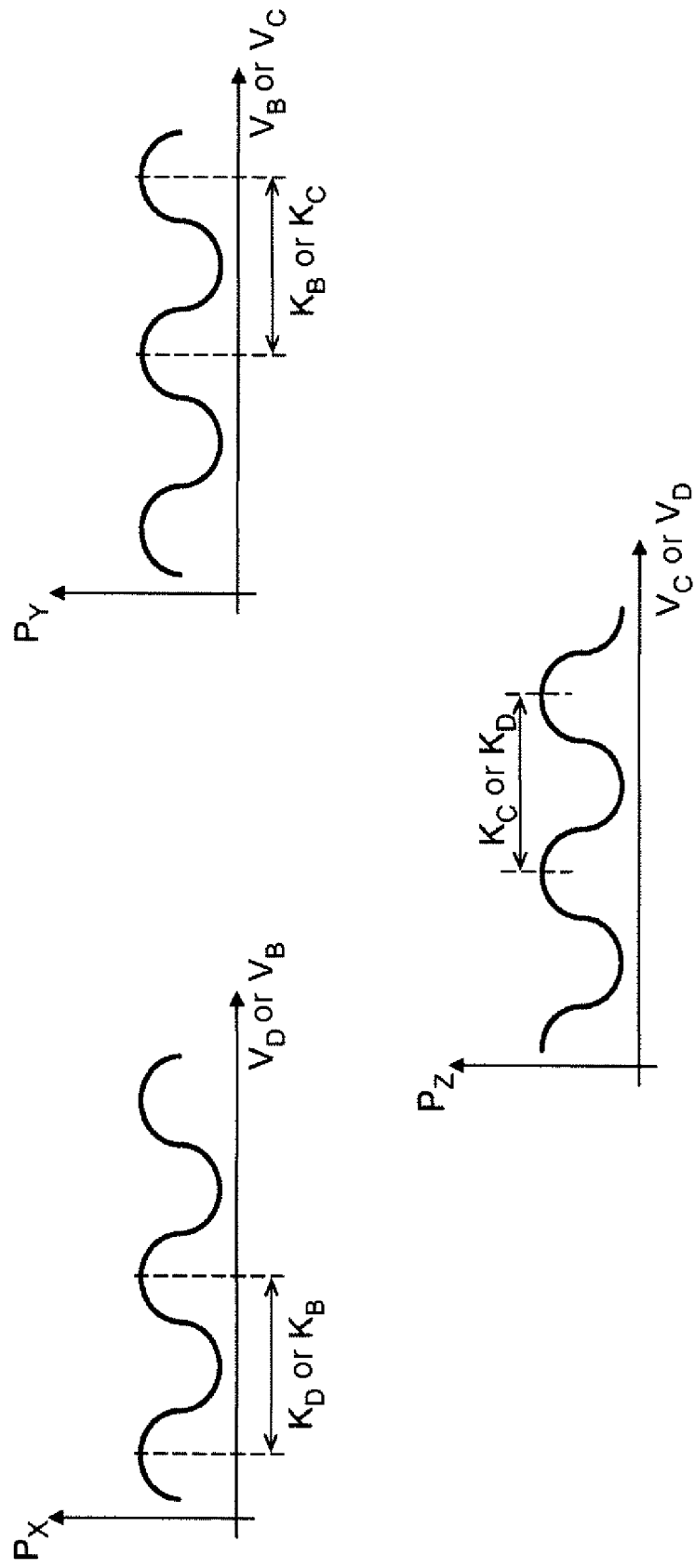
FIG. 2 represents by three graphs an illustration of an example of the change in the laser powers emitted by the optical cavities of a triple axis gyrometer as a function of the command voltages of their mobile mirrors.

FIG. 2 illustrates an example of the change in the laser powers $P_X$, $P_Y$ and $P_Z$ emitted by the cavities X, Y and Z, respectively, as a function of the command voltages $V_B$, $V_C$ and $V_D$ applied to the mirrors B, C and D, respectively, of the triple axis gyrometer of FIG. 1a. By the design of the gyrometer, $P_X$ does not depend on $V_C$, $P_Y$ does not depend on $V_D$ and $P_Z$ does not depend on $V_B$. It has been shown that the power variations are periodic with the commands, and that they exhibit a plurality of principal maxima. This is because, as illustrated by FIG. 1b, if the length L of the cavities X, Y or Z varies continuously, then the comb of frequencies which are a multiple of c/L progresses relative to the gain spectrum represented by the parabolic curve G. The intensity, and therefore the power emitted by this cavity, increases when a frequency which is a multiple of c/L approaches the maximum M, then decreases when this frequency which is a multiple of c/L moves away from the maximum M. In other words, the power emitted by the cavity increases when a mode approaches the maximum M then decreases when this mode moves away from the maximum M. Furthermore, since the modes enter and exit the gain spectrum one after the other when the comb advances relative to the gain spectrum, the power varies periodically. This is why, in FIG. 2, each of the power maxima corresponds to a mode or a frequency which is a multiple of c/L. It is this which explains the "mode hopping" phenomenon: by making L vary so as to maximize the emitted power, it is possible to change from one mode to the other. For various reasons, however, the mode changes are to be avoided during operation of the gyrometer. One mode should be selected when starting the gyrometer, then arrangements must be made in order to stay as close to the power maximum of this mode throughout the operation of the gyrometer. It should however be noted that, from one start of the gyrometer to another, the mode may differ according to the external temperature conditions and as a function of the initial position of the mobile mirrors. It should also be noted that the mode may differ from one cavity to another.

FIG. 2 also illustrates the quantities $K_B$, $K_C$ and $K_D$, which are the variations in the voltage commands on the mirrors B, C and D, respectively, which make it possible to change the lengths of the cavities X, Y and Z by an optical length $\lambda$. Even if the mobile mirrors substantially have an equal translation/electrical gain coefficient G, their small differences may be integrated over a large displacement of the order of $\lambda$, assuming that the quantities $K_B$, $K_C$ and $K_D$ can vary from one mirror to another. On the other hand, the geometry of the triple axis cavity makes it possible to ensure that these values remain independent of the cavity in question:

$$\begin{cases} L_X + \lambda = L_X^0 + G[V_D + K_D + V_B] = L_X^0 + G[V_D + V_B + K_B] \\ L_Y + \lambda = L_Y^0 + G[V_B + K_B + V_C] = L_Y^0 + G[V_B + V_C + K_C] \\ L_Z + \lambda = L_Z^0 + G[V_C + K_C + V_D] = L_Z^0 + G[V_C + V_D + K_D] \end{cases}$$

In what follows, the quantities $K_B$, $K_C$ and $K_D$ which make it possible to change the longitudinal modes emitted by the laser cavities, and which characterize the dynamics of the mobile mirrors, are referred to as "intermodes".

Figure 3:
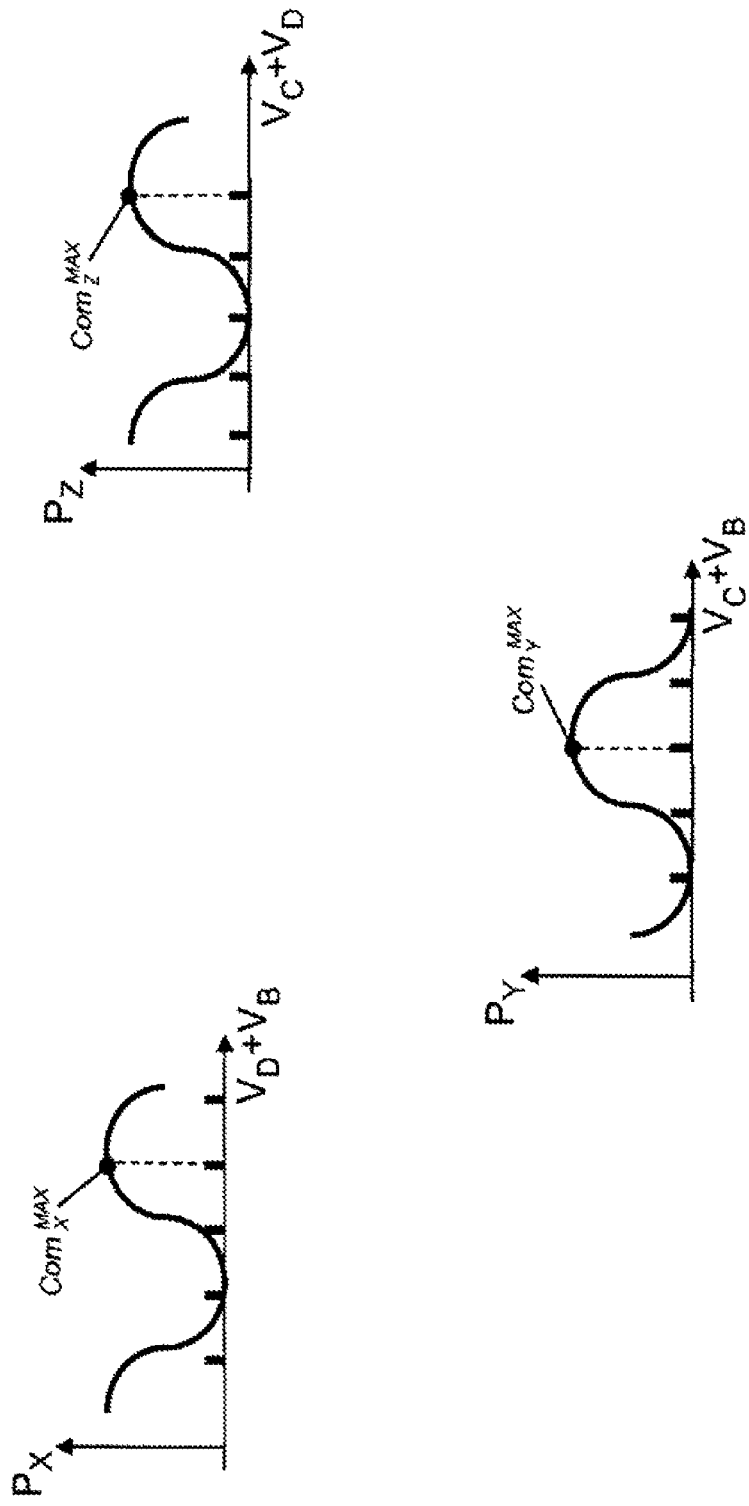
FIG. 3 represents by three graphs an illustration of an example of the change in the laser powers emitted by the optical cavities, with the same intermode, of a triple axis gyrometer as a function of the sum of the command voltages on which they depend.

FIG. 3 illustrates, in the case in which the three mobile mirrors B, C and D of the triple axis gyrometer in FIG. 1a have an equal intermode $K=K_B=K_C=K_D$, an example of the change in the laser powers emitted by the three cavities X, Y and Z as a function of the sum of the two command voltages on which they depend, i.e. $V_D+V_B$, $V_C+V_B$ and $V_C+V_D$, respectively. Command voltage sums $Com_X^{Max}$, $Com_Y^{Max}$ and $Com_Z^{Max}$ make it possible to obtain a maximum power emitted by the cavities X, Y and Z, respectively.

Figure 4:
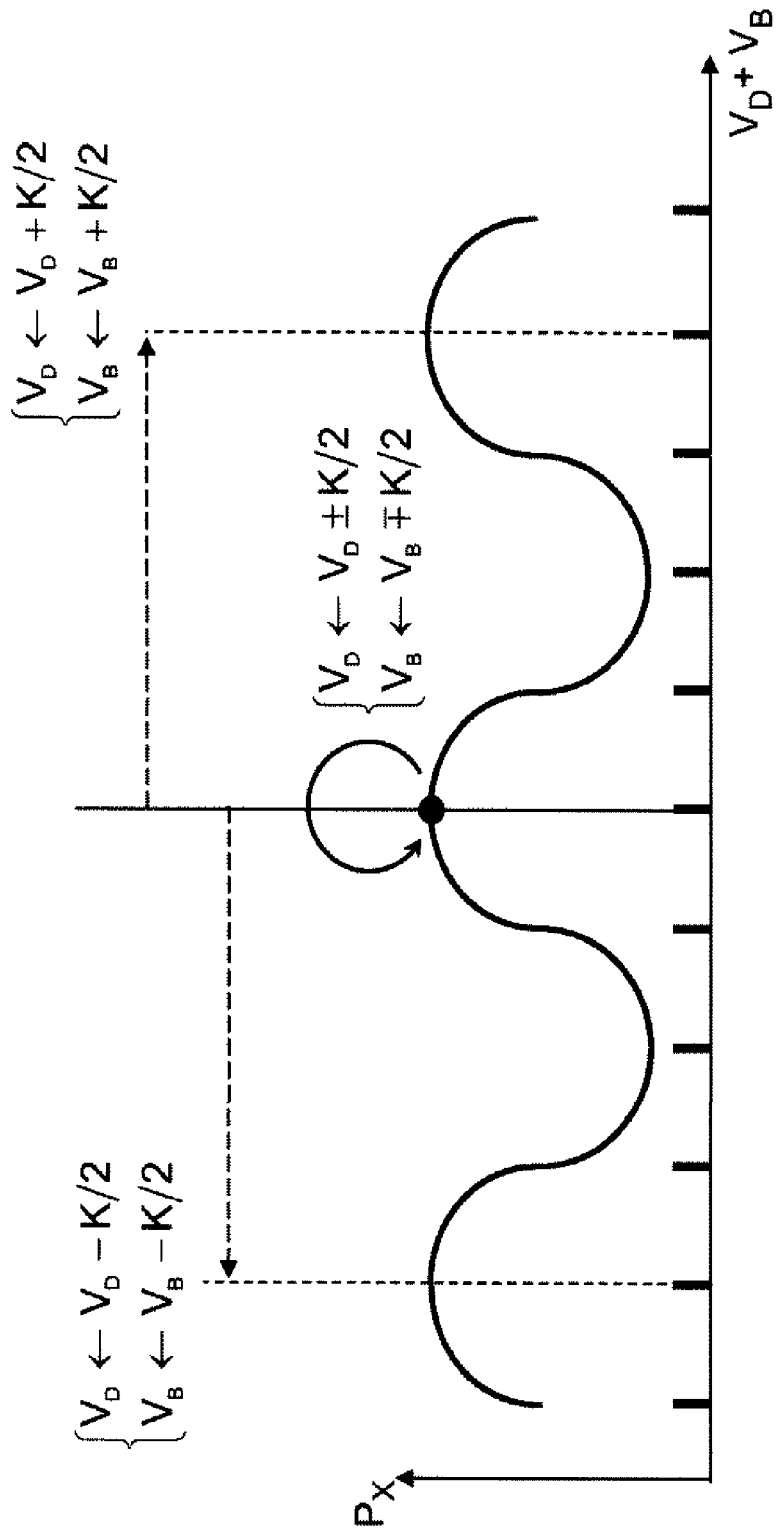
FIGS. 4 and 5 represent by two graphs illustrations of particular properties of the optical cavities, with the same intermode, of a triple axis gyrolaser.
Figure 5:
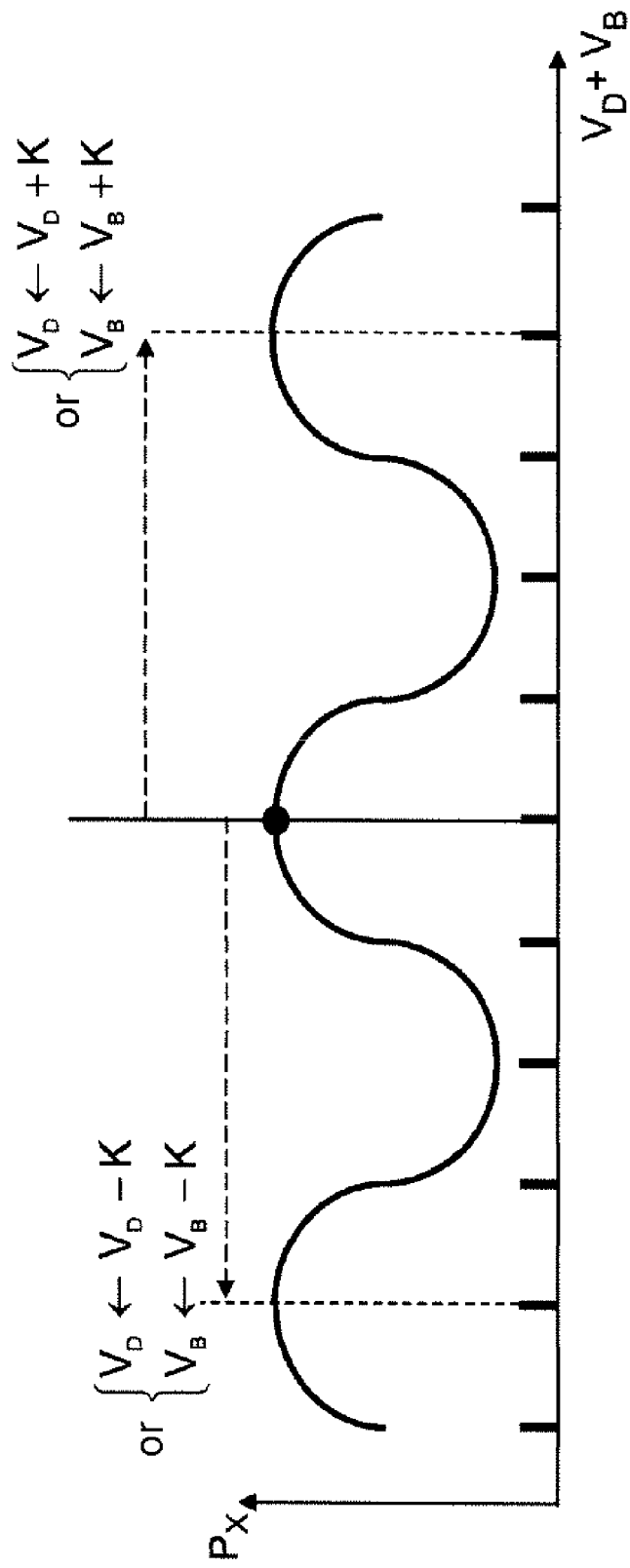

FIGS. 4 and 5 illustrate two properties of the cavities X, Y and Z with the same intermode K of the triple axis gyrolaser in FIG. 1a, by means of an example of the change in the laser power emitted by the cavity X as a function of the sum of the two command voltages on which it depends, i.e. $V_D+V_B$. The first property is that all three cavities remain at a gain maximum when all the piezoelectric voltages are changed by a half-intermode K/2. This first property is illustrated by FIG. 4 as regards the cavity X. The second property is that all three cavities remain at a gain maximum when a single one of the piezoelectric command voltages is changed by a full intermode K. This second property is illustrated by FIG. 5 as regards the cavity X.

The invention proposes to modify the generation of the signal which drives the displacement of the mobile mirrors when starting a laser triple axis gyrometer, so as to provide a programmable shift command which is independent of the autonomous CLT. It should be noted that the invention also applies to any device comprising optical ring cavities, so long as the powers of the light waves traveling through said optical cavities depend on the positions of the mobile mirrors. The laser gyrometer is given only by way of example. The invention also proposes to provide information in the control chain of the mirrors so as to be able to recover their position when the autonomous slaving is in operation. A temperature sensor may be employed in order to estimate the temperature of the gyrolaser, for example a thermistor or a thermocouple. One principle of the invention is to drive the commands by following a linear ramp or a more complex profile, in order to find the power maxima simultaneously in the three laser cavities, so as subsequently to be able to position the three mobile mirrors simultaneously at the positions which most advantageously satisfy the selected operating criteria. For example, in the case of the gyrometer in FIG. 1a, the driving of the mirrors according to Equation 4 may be modified by incorporating shift commands $D_X$, $D_Y$ and $D_Z$ according to Equation 5 below:

$$\begin{bmatrix} V_C \\ V_D \\ V_B \end{bmatrix} = -A \begin{bmatrix} -1 & 1 & 1 \\ 1 & -1 & 1 \\ 1 & 1 & -1 \end{bmatrix} \left( \begin{bmatrix} I_X \\ I_Y \\ I_Z \end{bmatrix} + \begin{bmatrix} D_X \\ D_Y \\ D_Z \end{bmatrix} \right) \quad (5)$$

The values $I_X$, $I_Y$ and $I_Z$ may be cancelled artificially, and the commands $D_X$, $D_Y$ and $D_Z$ may be driven by software. The device comprises sampling of the values $I_X$, $I_Y$ and $I_Z$ in order to be able to monitor them. With the control above, in which the inputs $I_X$, $I_Y$ and $I_Z$ are artificially cancelled, the command signals of the mobile mirrors $V_B$, $V_C$ and $V_D$ are then expressed as a function of the software commands $D_X$, $D_Y$ and $D_Z$:

$$\begin{bmatrix} V_C \\ V_D \\ V_B \end{bmatrix} = -A \begin{bmatrix} -1 & 1 & 1 \\ 1 & -1 & 1 \\ 1 & 1 & -1 \end{bmatrix} \begin{bmatrix} D_X \\ D_Y \\ D_Z \end{bmatrix} \quad (6)$$

Variation of the commands $D_X$, $D_Y$ and $D_Z$ makes it possible to obtain driving of the mobile mirrors (according to a linear ramp or a more complex profile) and simultaneously to scan each of the three cavities over at least one mode. For each value of the shift commands, the laser powers emitted by the three cavities may be acquired. The values $D_X^{Max}$, $D_Y^{Max}$ and $D_Z^{Max}$ at which the emitted intensities are maximal, respectively for the cavities X, Y, Z, may then be stored in memory. After the scanning, it is sufficient to assign the stored values $D_X^{Max}$, $D_Y^{Max}$ and $D_Z^{Max}$ to the shift commands in order to position the three mobile mirrors as close as possible to the power maxima simultaneously for the three cavities. Equation 7 gives the final values $V_B^{final}$, $V_C^{final}$ and $V_D^{final}$ obtained for the commands of the mirrors:

$$\begin{cases} V_B^{final} = A[-D_X^{Max} - D_Y^{Max} + D_Z^{Max}] \\ V_C^{final} = A[D_X^{Max} - D_Y^{Max} - D_Z^{Max}] \\ V_D^{final} = A[-D_X^{Max} + D_Y^{Max} - D_Z^{Max}] \end{cases} \quad (7)$$

Conversely, in this example, the values of the software commands $D_X$, $D_Y$ and $D_Z$ to be generated in order to obtain the values $V_B$, $V_C$ and $V_D$ of the translation commands are expressed as:

$$\begin{bmatrix} D_X \\ D_Y \\ D_Z \end{bmatrix} = \frac{-1}{2A} \begin{bmatrix} 0 & 1 & 1 \\ 1 & 0 & 1 \\ 1 & 1 & 0 \end{bmatrix} \begin{bmatrix} V_C \\ V_D \\ V_B \end{bmatrix} \quad (8)$$

This example does not restrict the method required for driving the mobile mirrors. Any technique corresponding to a bijection between the shift command and the command received by the mirrors will be suitable: it is sufficient to be able to program an independent scan for each mirror and that each of them can subsequently be placed at a calculated final position. A second example of a modification of the driving by the shift commands $D'_C$, $D'_D$ and $D'_B$ is given below, which allows a sequence of scanning the mirrors and subsequent positioning differentiated for each of them:

$$\begin{bmatrix} V_C \\ V_D \\ V_B \end{bmatrix} = -A \begin{bmatrix} -1 & 1 & 1 \\ 1 & -1 & 1 \\ 1 & 1 & -1 \end{bmatrix} \begin{bmatrix} I_X \\ I_Y \\ I_Z \end{bmatrix} + \begin{bmatrix} D'_C \\ D'_D \\ D'_B \end{bmatrix} \quad (9)$$

with the capacity of artificially cancelling the values $I_X$, $I_Y$ and $I_Z$ and driving the commands $D'_C$, $D'_D$ and $D'_B$ by software.

Figure 9:
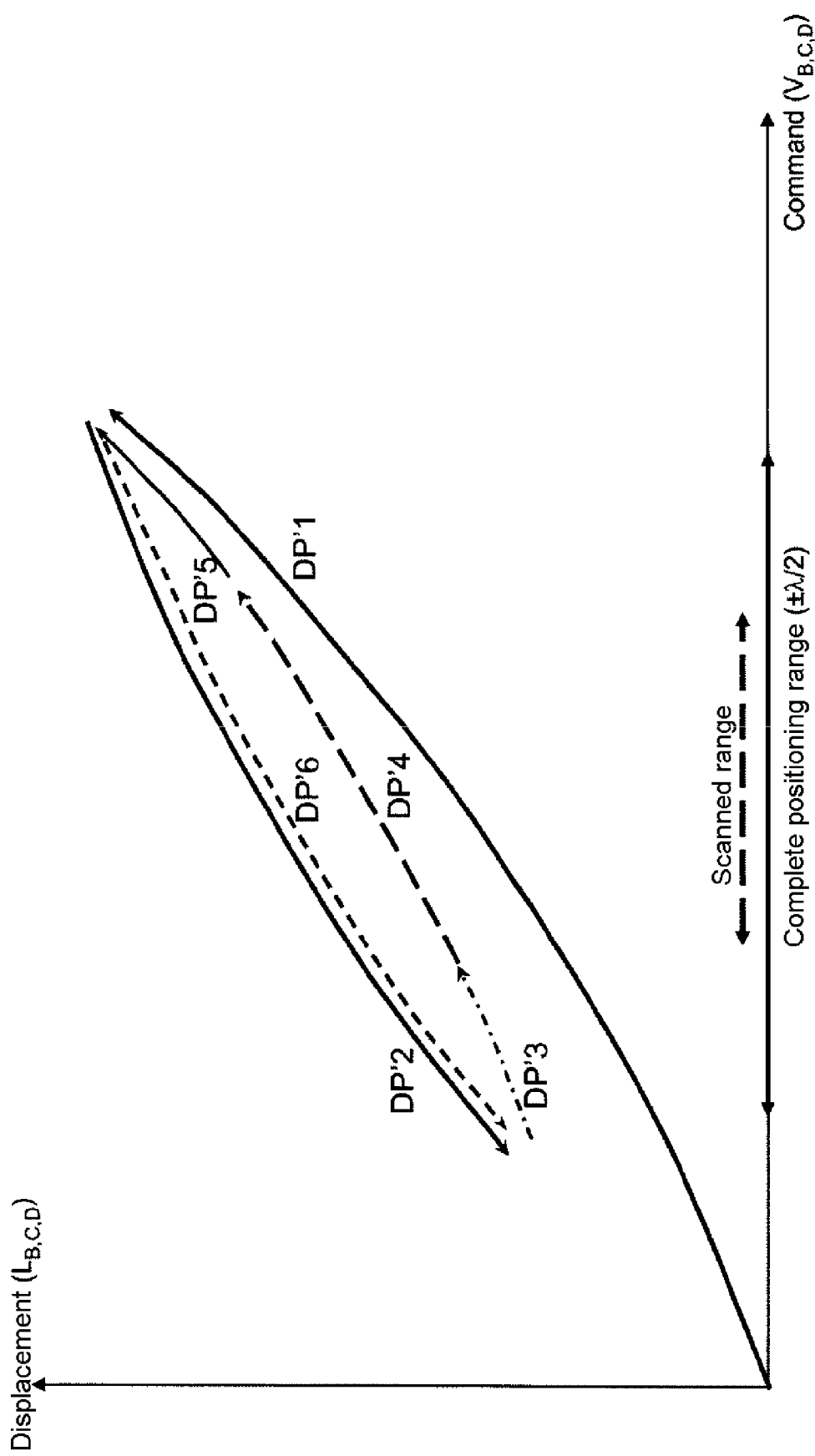

The invention also proposes to be able to determine the position of the mirrors when the autonomous slaving is in operation. In the first example, given by Equation 5, the commands of the mirrors may be determined by a measurement of the generated values $V_B$, $V_C$ and $V_D$, or on the basis of the values $I_{X,Y,Z}+D_{X,Y,Z}$, which may be measured independently or known directly in the case of operations carried out by software. In the case of the second example of commands of the mobile mirrors, which is illustrated by FIG. 9, the commands of the mirrors may also be determined by a measurement of the generated values $V_B$, $V_C$ and $V_D$. They may also be estimated on the basis of the values $I_X$, $I_Y$ and $I_Z$ as well as $D'_C$, $D'_D$ ad $D'_B$, measured independently or known directly in the case of operations carried out by software. The quantity A may be assumed to be a known constant, or it may be extracted from a table collating values of A with values of temperature, for example. The initial scanning is not restricted to a linear ramp, but may have a more complex shape in order to improve the positioning in terms of precision, reproducibility or speed. The final positions of the mobile mirrors may be selected from among several possibilities in order to improve the positioning, in order to take specific features of each mirror into account, in order to influence their behavior, or in order to compensate for certain effects.

One configuration which may be envisaged corresponds to the case in which the three mobile mirrors B, C and D have an equal intermode $K=K_B=K_C=K_D$. The point is to show how it is possible to obtain a scan of the three mirrors in the same range, in order to position them in an interval which is likewise identical and as close as possible to the intensity maximum of the three cavities. In order to scan a mode of a selected laser cavity, it is sufficient to apply to one of the two mobile mirrors a variation of its command by the value K, for example by scanning the command by $\pm K/2$ around an average value. When simultaneously scanning the two mobile mirrors of this cavity, it is sufficient to apply a variation of $\pm K/4$ for each. In this way, a simultaneous scan of the three mirrors over a variation of $\pm K/4$ around an average value makes it possible to scan the three cavities of the triple axis laser gyrometer over a mode.

For the first command example of the mirrors which is presented, Equation 8 shows that the three mobile mirrors carry out a scan over $\pm K/4$, that is to say $V_{B,C,D}=V_{B,C,D}^0 \pm K/4$, if the commands $D_X$, $D_Y$ and $D_Z$ explore the intervals given by Equation 10 below:

$$\begin{cases} D_X = \frac{-1}{2A}\left[V_D^0 + V_B^0 \pm \frac{K}{2}\right] = D_X^0 \mp \frac{K}{4A} \\ D_Y = \frac{-1}{2A}\left[V_B^0 + V_C^0 \pm \frac{K}{2}\right] = D_Y^0 \mp \frac{K}{4A} \\ D_Z = \frac{-1}{2A}\left[V_C^0 + V_D^0 \pm \frac{K}{2}\right] = D_Z^0 \mp \frac{K}{4A} \end{cases} \quad (10)$$

It is then sufficient to store in memory the values of the commands $D_X^{Max}$, $D_Y^{Max}$ and $D_Z^{Max}$ at which the respective intensities of the cavities X, Y, Z are maximal. The final values $V_B^{final}, V_C^{final}, V_D^{final}$ of the commands of the mobile mirrors, at which the three cavities are simultaneously close to their maximum, are obtained according to Equation 11 below:

$$\begin{cases} V_B^{final} = A[-D_X^{Max} - D_Y^{Max} + D_Z^{Max}] \\ V_C^{final} = A[D_X^{Max} - D_Y^{Max} - D_Z^{Max}] \\ V_D^{final} = A[-D_X^{Max} + D_Y^{Max} - D_Z^{Max}] \end{cases} \quad (11)$$

Equations 10 and 11 make it possible to determine the intervals in which the commands $V_B^{final}, V_C^{final}, V_D^{final}$ are found, which gives Equation 12:

$$\begin{cases} V_B^{final} = A\frac{1}{2A}[2V_B^0 \pm 3K/2] = A[-D_X^0 - D_Y^0 + D_Z^0] \pm 3K/4 = V_B^0 \pm 3K/4 \\ V_C^{final} = A\frac{1}{2A}[2V_C^0 \pm 3K/2] = A[D_X^0 - D_Y^0 - D_Z^0] \pm 3K/4 = V_C^0 \pm 3K/4 \\ V_D^{final} = A\frac{1}{2A}[2V_D^0 \pm 3K/2] = A[-D_X^0 + D_Y^0 - D_Z^0] \pm 3K/4 = V_D^0 \pm 3K/4 \end{cases} \quad (12)$$

The commands calculated in order to simultaneously bring the three cavities to the vicinity of their intensity maximum are automatically found in an interval centered around the same value $V_{B,C,D}^0$ as during the scan, but with a larger amplitude $\pm 3K/4$. For the second example of commands, Equation 9 leads to the same result.

Finally, when the choice is made to drive the commands in an equal interval, the mobile mirrors simultaneously scan an identical range $$\left[V_{B,C,D}^0 - \frac{K}{4}; V_{B,C,D}^0 + \frac{K}{4}\right]$$

and are then simultaneously positioned in the same interval $$\left[V_{B,C,D}^0 - \frac{3K}{4}; V_{B,C,D}^0 + \frac{3K}{4}\right]$$

with $V_B^0 = V_C^0 = V_D^0 = -AD_X^0$.

The precision of the final positioning is determined by a compromise between reducing the increment of the scan, the level of noise in the power measurements and the number of acquisition repetitions at each point. This driving of the mobile mirrors improves the determination of the initial positioning of the mobile mirrors: the sequence and the driving make it possible to have rapid and reliable positioning at the laser gain simultaneously for the three cavities.

Still in the case in which the three mobile mirrors B, C and D have an equal intermode, after having shown how it is possible to obtain scan of the three mirrors in the same range, in order to position them in an interval which is likewise identical and as close as possible to the intensity maximum of the three cavities, the point is now to show how it is possible to obtain scanning and positioning in an interval specific to each mobile mirror while simultaneously bringing the three cavities as close as possible to the intensity maximum.

In the first example, Equation 6 indicates that by the ranges explored by the controls $$D_{X,Y,Z} = D_{X,Y,Z}^0 \mp \frac{K}{4A}$$

with $D_X^0 \neq D_Y^0 \neq D_Z^0 \neq D_X^0$ are selected properly, the intervals scanned if the mobile mirrors can be differentiated according to Equation 13 below:

$$\begin{bmatrix} V_C \\ V_D \\ V_B \end{bmatrix} = -A \begin{bmatrix} -1 & 1 & 1 \\ 1 & -1 & 1 \\ 1 & 1 & -1 \end{bmatrix} \begin{bmatrix} D_X^0 \mp \frac{K}{4A} \\ D_Y^0 \mp \frac{K}{4A} \\ D_Z^0 \mp \frac{K}{4A} \end{bmatrix} \quad (13)$$

$$= \begin{bmatrix} A(+D_X^0 - D_Y^0 - D_Z^0) \\ A(-D_X^0 + D_Y^0 - D_Z^0) \\ A(-D_X^0 - D_Y^0 + D_Z^0) \end{bmatrix} \pm \begin{bmatrix} K/4 \\ K/4 \\ K/4 \end{bmatrix}$$

The mirrors then scan ranges centered around separate values $V_B^0, V_C^0, V_D^0$ given by $$\begin{cases} V_B^0 = A[-D_X^0 - D_Y^0 + D_Z^0] \\ V_C^0 = A[D_X^0 - D_Y^0 - D_Z^0] \\ V_D^0 = A[-D_X^0 + D_Y^0 - D_Z^0] \end{cases}$$

but with an equal amplitude ±K/4. As before, it is then sufficient to store in memory the values of the commands $D_X^{Max}$, $D_Y^{Max}$ and $D_Z^{Max}$ at which the respective intensities of the cavities X, Y, Z are maximal. The final values of the commands of the mobile mirrors $V_B^{final}$, $V_C^{final}$ and $V_D^{final}$, at which the three cavities will be simultaneously close to their corresponding maximum, are as before $$\begin{cases} V_B^{final} = A[-D_X^{Max} - D_Y^{Max} + D_Z^{Max}] \\ V_C^{final} = A[D_X^{Max} - D_Y^{Max} - D_Z^{Max}] \\ V_D^{final} = A[-D_X^{Max} + D_Y^{Max} - D_Z^{Max}]. \end{cases}$$

Equation 12 shows that the commands $D_X^{Max}$, $D_Y^{Max}$ and $D_Z^{Max}$ simultaneously bringing the three cavities to the vicinity of their intensity maximum automatically brings the mobile mirrors into an interval centered around the same value as for the scan based on $V_B^0, V_C^0$ and $V_D^0$, but with a larger amplitude ±3K/4. The second example of commands of the mobile mirrors leads to the same result via Equation 9.

Finally, when the choice is made to drive the commands in different intervals, the mobile mirrors can simultaneously scan separate ranges $$\left[V_{B,C,D}^0 - \frac{K}{4}; V_{B,C,D}^0 + \frac{K}{4}\right]$$

and subsequently be positioned simultaneously in individual ranges $$\left[V_{B,C,D}^0 - \frac{3K}{4}; V_{B,C,D}^0 + \frac{3K}{4}\right], \text{ with}$$

$$\begin{cases} V_B^0 = A[-D_X^0 - D_Y^0 + D_Z^0] \\ V_C^0 = A[D_X^0 - D_Y^0 - D_Z^0] \\ V_D^0 = A[-D_X^0 + D_Y^0 - D_Z^0]. \end{cases}$$

The final positioning precision is also determined by a compromise between the scanning increment, the precision of which can be enhanced by increasing the number of points sampled along the scan, the level of the noise in the power measurements and the number of acquisition repetitions at each point. Specifically, repeating the acquisitions at a given point makes it possible to reduce the contribution of the noise but increases the total duration of the scan. This driving of the mobile mirrors further improves the determination of the positioning of the mobile mirrors: the sequence and the driving make it possible to have rapid and reliable positioning, which can be individualized as a function of the mobile mirror, at the maximum of the laser gain simultaneously for the three cavities. Selecting the scanning and positioning ranges as a function of the initial temperature can make it possible to anticipate behavioral changes of the mobile mirrors.

Still in the case in which the three mobile mirrors B, C and D have an equal intermode, after having shown how it is possible to obtain a scan of the three mirrors in the same range, in order to position them in intervals which are identical or specific to each of them by simultaneously placing them as close as possible to the intensity maximum of their cavity then driving them in intervals of ±3K/4 around an average value $$\left[V_{B,C,D}^0 - \frac{3K}{4}; V_{B,C,D}^0 + \frac{3K}{4}\right],$$

the point is now to show how it is possible to reduce these intervals to a range of ±K/2. A study of the triple axis cavities shows that when one voltage command at the end of a range is reached, the other two commands lie on the opposite side. This property of the positioning of the maxima for the triple axis cavities is illustrated in the case of the mirror B by the following two assertions:

$$V_B^{final} > V_B^0 + K/2 \Rightarrow \begin{cases} V_C^{final} \in [V_C^0 - K/2; V_C^0] \\ V_D^{final} \in [V_D^0 - K/2; V_D^0] \end{cases}$$

$$V_B^{final} < V_B^0 - K/2 \Rightarrow \begin{cases} V_C^{final} \in [V_C^0; V_C^0 + K/2] \\ V_D^{final} \in [V_D^0; V_D^0 + K/2] \end{cases}$$

Four other equivalent assertions can be obtained by cyclic permutation between the mirrors.

The invention proposes notably to use the first property of the triple axis laser cavities, which is illustrated by FIG. 4, in order to shift all the commands of the mirrors while keeping the cavities in proximity to a gain maximum. By shifting the mirror at the range end by a half-intermode in order to bring it to a median value, and by compensating the command of the other two by a half-intermode in the opposite direction, two cavities are kept at the same mode and the third jumps a mode.

Each of the following operations can therefore advantageously make it possible to re-center the commands while keeping two cavities at the same mode and making the third jump a mode, according to Table 1:

TABLE 1

| $\begin{cases} VP_C \leftarrow VP_C - K/2 \\ VP_D \leftarrow VP_D + K/2 \\ VP_B \leftarrow VP_B + K/2 \end{cases}$ | $\begin{cases} VP_C \leftarrow VP_C + K/2 \\ VP_D \leftarrow VP_D - K/2 \\ VP_B \leftarrow VP_B + K/2 \end{cases}$ | $\begin{cases} VP_C \leftarrow VP_C + K/2 \\ VP_D \leftarrow VP_D + K/2 \\ VP_B \leftarrow VP_B - K/2 \end{cases}$ |
|---|---|---|
| $\begin{cases} VP_C \leftarrow VP_C + K/2 \\ VP_D \leftarrow VP_D - K/2 \\ VP_B \leftarrow VP_B - K/2 \end{cases}$ | $\begin{cases} VP_C \leftarrow VP_C - K/2 \\ VP_D \leftarrow VP_D + K/2 \\ VP_B \leftarrow VP_B - K/2 \end{cases}$ | $\begin{cases} VP_C \leftarrow VP_C - K/2 \\ VP_D \leftarrow VP_D - K/2 \\ VP_B \leftarrow VP_B + K/2 \end{cases}$ |
| Re-centering for mirror C at the end | Re-centering for mirror D at the end | Re-centering for mirror B at the end |

Having calculated the commands of the mirrors in the interval ±3K/4 at the end of the scan, and when one of the values leaves the interval ±K/2, the proposed modification of the commands makes it possible to redefine values in the interval ±K/2, these values simultaneously bringing the three cavities as close as possible to their gain maximum.

The invention also proposes to use the second property of the triple axis laser cavities, which is illustrated by FIG. 5, in order to shift the command of a single mirror while keeping all the cavities in proximity to a gain maximum. By shifting the mirror at the range end by a full intermode, it is brought toward the median value of the interval. Each of the following operations can therefore advantageously make it possible to shift the command of a mirror while keeping one cavity at the same mode and making the other two jump a mode, according to Table 2:

TABLE 2

| $\begin{cases} VP_C \leftarrow VP_C \pm K \\ VP_D \leftarrow VP_D \\ VP_B \leftarrow VP_B \end{cases}$ | $\begin{cases} VP_C \leftarrow VP_C \\ VP_D \leftarrow VP_D \pm K \\ VP_B \leftarrow VP_B \end{cases}$ | $\begin{cases} VP_C \leftarrow VP_C \\ VP_D \leftarrow VP_D \\ VP_B \leftarrow VP_B \pm K \end{cases}$ |
|---|---|---|
| Re-centering for mirror C at the end | Re-centering for mirror D at the end | Re-centering for mirror B at the end |

Having calculated the commands of the mirrors in the interval ±3K/4 at the end of the scan, and when one of the values leaves the interval ±K/2, the proposed modification of a command can make it possible to redefine values on the same side of the interval.

Finally, after scanning the mirrors and determining the commands which simultaneously bring the three laser cavities as close as possible to a gain maximum, the operations presented above make it possible to reduce the range of possible values. These modifications make it possible to promote behavior allowing the mechanical stresses to be reduced in the components of the mobile mirrors, such as deformable disks or adhesive joints, and consequently to increase the reliability of the assembly constituting the mobile mirror.

After having shown how it is possible, when the three mobile mirrors have an equal intermode, to scan their positions in order to position them in intervals specific to each of them while placing them simultaneously as close as possible to the intensity maximum of the three cavities, the mobile mirrors finally being driven in intervals of equal amplitudes ±3K/4 around an average value $$\left[V_{B,C,D}^0 - \frac{3K}{4}; V_{B,C,D}^0 + \frac{3K}{4}\right]$$

specific to each of them, the point is now to envisage the case in which the three mobile mirrors B, C and D have different intermodes denoted $K_B$, $K_C$ and $K_D$. It is possible to obtain a scan of the mobile mirrors in intervals with centers and amplitudes specific to each mirror, and subsequently to position them as close as possible to a gain maximum. Each cavity X, Y and Z can still be scanned over a full mode if the three mobile mirrors are simultaneously displaced by $\pm K_{B,C,D}/4$ respectively, according to the equation $V_{B,C,D} = V_{B,C,D}^0 \pm K_{B,C,D}/4$. Equation 10 is no longer applicable, but Equation 8 shows that these scans can be obtained when the shift commands $D_X$, $D_Y$ and $D_Z$ explore the following intervals 14:

$$\begin{cases} D_X = \frac{-1}{2A}\left[V_D^0 + V_B^0 \pm \frac{K_X}{2}\right] = D_X^0 \mp \frac{K_X}{4A} \\ D_Y = \frac{-1}{2A}\left[V_B^0 + V_C^0 \pm \frac{K_Y}{2}\right] = D_Y^0 \mp \frac{K_Y}{4A} \\ D_Z = \frac{-1}{2A}\left[V_C^0 + V_D^0 \pm \frac{K_Z}{2}\right] = D_Z^0 \mp \frac{K_Z}{4A} \end{cases} \quad (14)$$

where $K_X$, $K_Y$ and $K_Z$ are given by Equations 15 below:

$$\begin{cases} K_X = (K_D + K_B)/2 \\ K_Y = (K_B + K_C)/2 \\ K_Z = (K_C + K_D)/2 \end{cases} \quad (15)$$

By writing $\overline{K} = (K_B + K_C + K_D)/3$, it is possible to obtain $K_X + K_Y + K_Z = K_B + K_C + K_D = 3\overline{K}$. During the scan, it is sufficient to store in memory the values of the commands $D_X^{Max}$, $D_Y^{Max}$ and $D_Z^{Max}$, at which the respective intensities of the cavities X, Y and Z are maximal. The final values $V_B^{final}$, $V_C^{final}$ and $V_D^{final}$ of the commands of the mobile mirrors, with which the three cavities will simultaneously be placed close to their maximum, are given by the following Equations 16:

$$\begin{cases} V_B^{final} = A[-D_X^{Max} - D_Y^{Max} + D_Z^{Max}] = A\frac{1}{2A}(2V_B^0 \pm 3\overline{K}/2) = V_B^0 \pm 3\overline{K}/4 \\ V_C^{final} = A[D_X^{Max} - D_Y^{Max} - D_Z^{Max}] = A\frac{1}{2A}(2V_C^0 \pm 3\overline{K}/2) = V_C^0 \pm 3\overline{K}/4 \\ V_D^{final} = A[-D_X^{Max} + D_Y^{Max} - D_Z^{Max}] = A\frac{1}{2A}(2V_D^0 \pm 3\overline{K}/2) = V_D^0 \pm 3\overline{K}/4 \end{cases}$$ (16)

The values of the mirror commands which simultaneously bring the three cavities in proximity to a gain maximum are therefore automatically found in intervals whose centers $V_B^0$, $V_C^0$ and $V_D^0$ are specific to the mirror but with an equal amplitude $\pm 3\overline{K}/4$ calculated over the average of the intermodes of the three mirrors. The command example of the mobile mirrors which is illustrated by Equation 9 leads to the same results. The commands can therefore be driven in intervals with different centers and amplitudes, and the mobile mirrors can subsequently be positioned simultaneously in individual intervals with different centers but the same width. This method does not make it possible to reduce the solution range for the mirror with the smallest intermode. It is the re-centering procedure, which can subsequently be carried out, that makes it possible to return the commands of the mirrors into a range with an amplitude equal to their intermode.

It was shown above that when the three mobile mirrors have an equal intermode, it is possible to position them simultaneously as close as possible to the intensity maximum of the three cavities in ranges which can be reduced to an amplitude of $\pm K/2$. The point is now to envisage the case in which the three mobile mirrors have different intermodes. It has been shown that the mobile mirrors are then positioned simultaneously in intervals with different centers but the same amplitude $\pm \overline{K}/2$. It can be shown that it is possible to reduce the final positioning range of each mirror by taking its individual intermode into account. Driving the mirrors according to one or other of the two examples presented leads to modification of the positioning property of the maxima. When one voltage command at the range end is reached, the other two commands are shifted in the direction of the opposite side. This property of the positioning of the maxima for the triple axis cavities with different intermodes is illustrated in the case of the mirror B by the following two assertions:

$V_B^{final} > V_B^0 + K_B/2 \Rightarrow$ $\begin{cases} V_C^{final} \in [V_C^0 - (2K_D + K_C - K_B)/4; V_C^0 + (K_C - K_B)/4] \\ V_D^{final} \in [V_D^0 - (2K_C + K_D - K_B)/4; V_D^0 + (K_D - K_B)/4] \end{cases}$ $V_B^{final} < V_B^0 - K_B/2 \Rightarrow$ $\begin{cases} V_C^{final} \in [V_C^0 - (K_C - K_B)/4; V_C^0 + (2K_D + K_C - K_B)/4] \\ V_D^{final} \in [V_D^0 - (K_D - K_B)/4; V_D^0 + (2K_C + K_D - K_B)/4] \end{cases}$ Four other equivalent assertions can be obtained by cyclic permutation between the mirrors. A command such that $V_B^{final} > V_B^0 + K_B/2$ therefore tends to shift the values $V_C^{final}$ and $V_D^{final}$, which can at most slightly exceed $V_C^0$ and $V_D^0$, respectively, to the lower side of their range. It is therefore still possible to carry out re-centering so as to reduce the command $V_B^{final}$ by one half-intermode $K_B/2$ and increase the other two commands by one half of their individual intermode. These operations can then cause the commands $V_C$ and $V_D$ to leave the interval $[V_{C,D}^0 - K_{C,D}/2; V_{C,D}^0 + K_{C,D}/2]$ slightly, but they make it possible to reduce the final positioning range of each mirror by taking its individual intermode into account. In this way, the proposed driving sequence makes it possible to take the dynamic behavior of each of the mobile mirrors into account.

For mirrors with different intermodes, it is therefore possible to obtain a scan in intervals with centers and amplitudes specific to each of them, and subsequently position then simultaneously as close as possible to a gain maximum. This method does not, however, make it possible to reduce the solution range for the mirror with the smallest intermode. In the case of a cavity whose mirrors have different intermodes, the highest of the values may also be characterized beforehand. By scanning the three mobile mirrors over the corresponding amplitude, it is certain that each cavity will pass through a gain maximum which can be identified.

Figure 6:
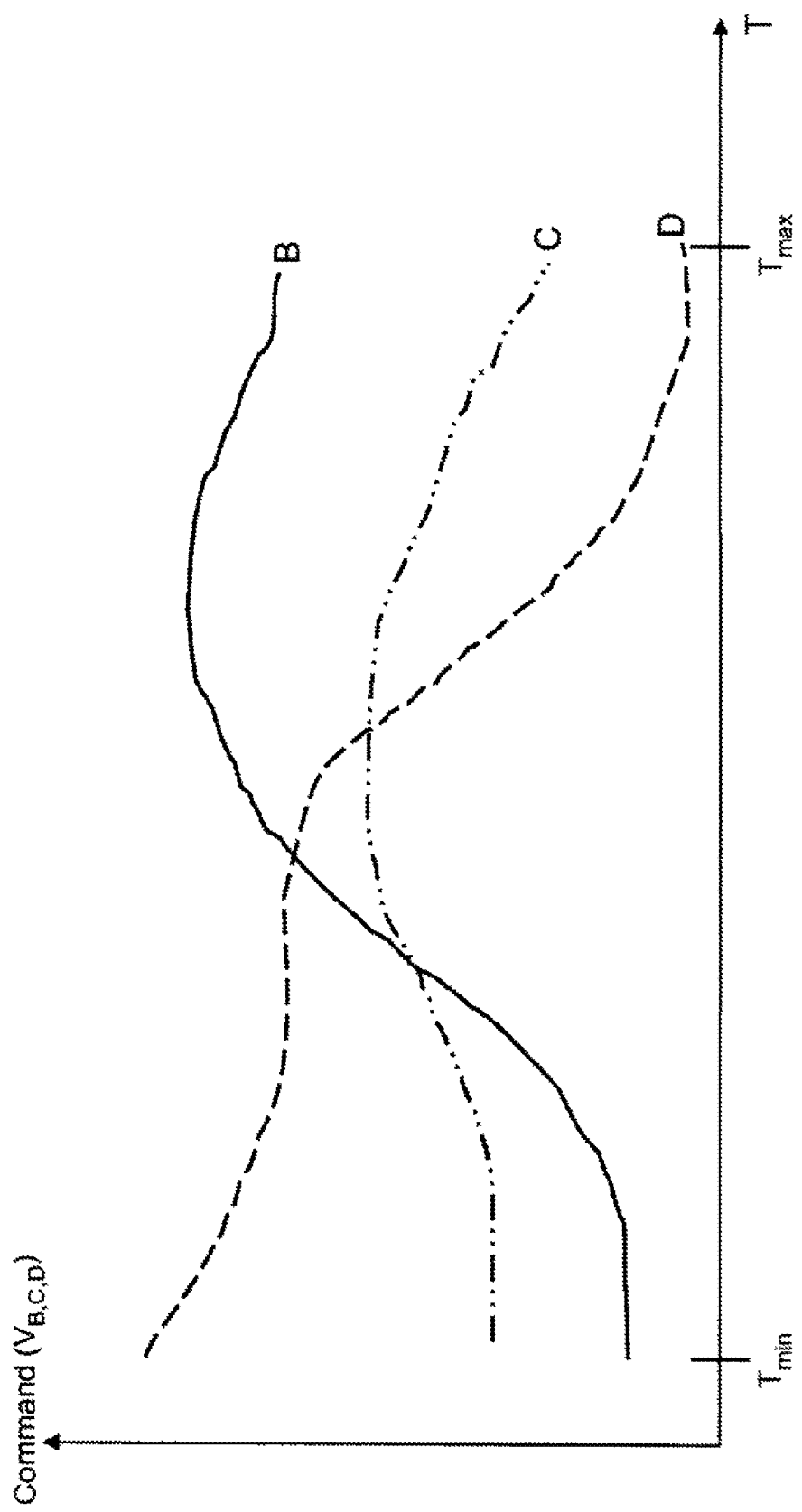
FIG. 6 represents by a graph an illustration of the command variations of the mobile mirrors of a triple axis gyrometer as a function of a positive thermal gradient.

The point is now to show that the proposed invention makes it possible to take the thermal behavior of each of the mobile mirrors into account in their positioning when starting a gyrolaser. When the gyrolaser has been started, the environment in which it is used may introduce significant thermal variations. Under the effect of these temperature variations, the optical block as well as the fixing mechanisms deform and induce a variation in the optical lengths of the laser cavities. The autonomous slaving electronics keep the parameters of the cavities constant and at the gain maximum by adjusting the values of the commands of the mobile mirrors. In what follows, the "thermal behavior" of a mobile mirror will refer to the variation in its command due to the autonomous slaving when the gyrolaser is in operation and experiences a thermal variation equal to its full working range. FIG. 6 illustrates by a graph the command variations of the mirrors B, C and D which can be observed as a function of a positive thermal gradient. The mirror B has a large positive variation: its command increases overall with a global maximum possibly below the maximum temperature. The mirror D shows a large negative variation: its command decreases overall with a minimum possibly below the minimum temperature. The mirror C has a small variation: its command has an extremum in the middle of the temperature range, which may be a maximum as illustrated by FIG. 6 but also a minimum. Finally, during the thermal variations, the set of stresses between the fixing mechanisms, the block and its components, notably the mobile mirrors themselves, causes a variation in the commands which must nevertheless remain in their range of validity so that the autonomous slaving remains operational. The invention can notably make it possible to use the information of a temperature sensor in order to adapt the range of scanning and positioning of each mobile mirror during the sequence. A preliminary characterization can make it possible to evaluate the thermal behavior of each mirror. Temperature thresholds may then be determined, either by a compromise between the characteristics of the mirrors, or by a more general compromise relating to the gyrolaser, and these thresholds may be stored in tables. For each mirror and for each starting temperature threshold, it is then possible to define a possible positive variation ΔVpos for its command and a negative variation ΔVneg. A possible positioning range of each mirror may be chosen, by selecting its center so that it remains in the range of validity of the autonomous slaving. The invention can thus make it possible to take the thermal and dynamic behavior of each of the mobile mirrors into account. The invention can also make it possible to favor the orientation of the displacement of each of the mirrors. The positioning range may be selected in order to favor a command such that the translation mechanism pushes the mirror more often than it pulls it. The device may also make it possible to favor operation by pulling or operation centered on a predetermined value. The invention can also make it possible to reduce the total variation of the commands during operation, and therefore to reduce the required command range. In the case in which the mirrors are controlled by voltage, the invention can make it possible to avoid resorting to high voltages and to avoid mode hopping during operation after the starting sequence.

Figure 7:
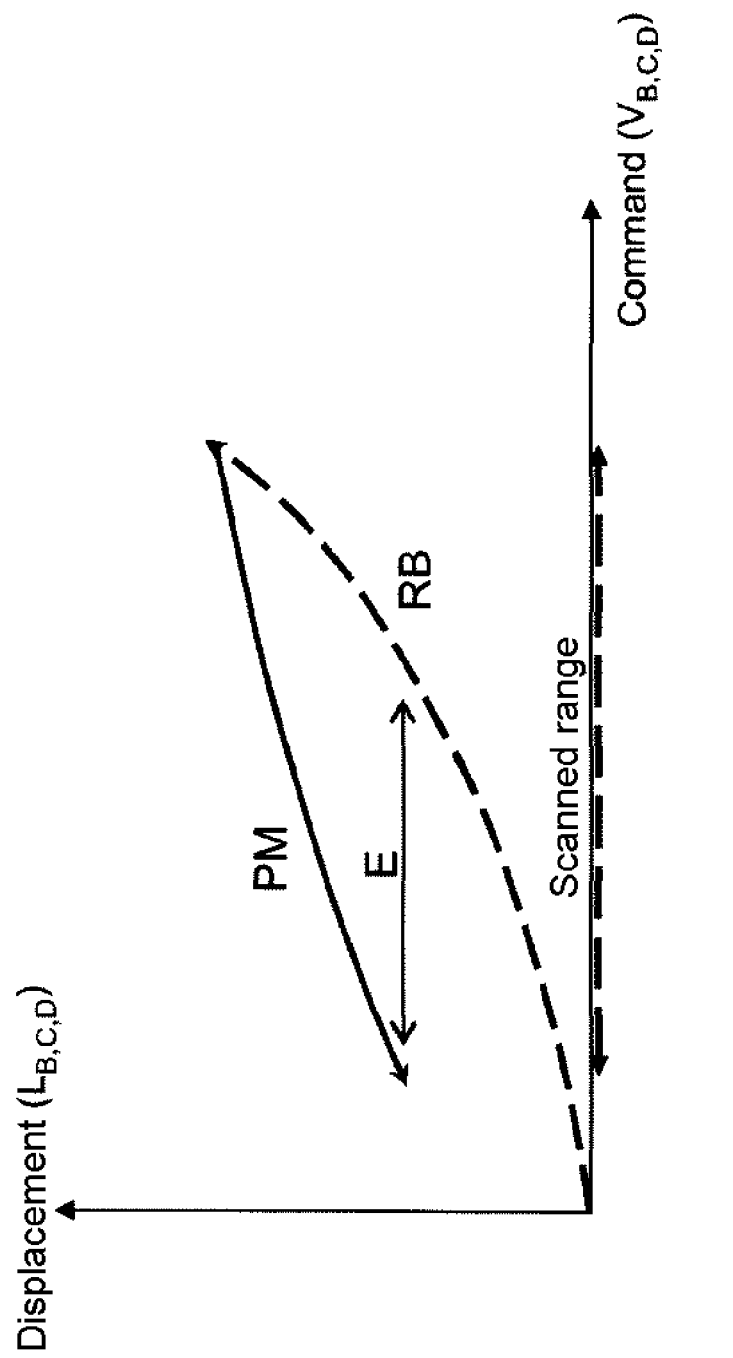
FIG. 7 represents by a graph an illustration of the hysteresis phenomenon observable in the displacement of a mobile mirror of an optical cavity in a laser gyrometer according to the prior art.

The proposed invention can also make it possible to take into account the phenomenon of hysteresis in the positioning of the mobile mirrors, and to reduce its influence. The positioning sequences described above assume reproducibility of the displacement of the mirrors with their command. For a given value of command $V_B$, $V_C$ or $V_D$, the mirrors are always geometrically shifted by an equal quantity $L_B$, $L_C$ or $L_D$ according to Equation 1. Among the elements which form these mirrors, materials which have mechanical hystereses may be employed. The translation of the mirror will then no longer be linear with its command, and its response will have a characteristic of the type represented in FIG. 7. In the sequences illustrated by FIG. 7, following a first upward scanning ramp RB, the mirrors are driven toward an identified position of a gain maximum, for example by retracting the mirror according to a positioning displacement PM of the mirror. The response hysteresis introduces a positioning error E between the required position and the position actually reached by the mirrors following their translations. The sum of these errors between the mirrors of the three cavities may lead to the laser cavities being positioned significantly far away from the intended gain maximum. By initially going through the command range before carrying out the scan during which the powers are recorded and compared, the hysteresis phenomenon can advantageously be reduced as illustrated by FIGS. 8 and 9.

Figure 8:
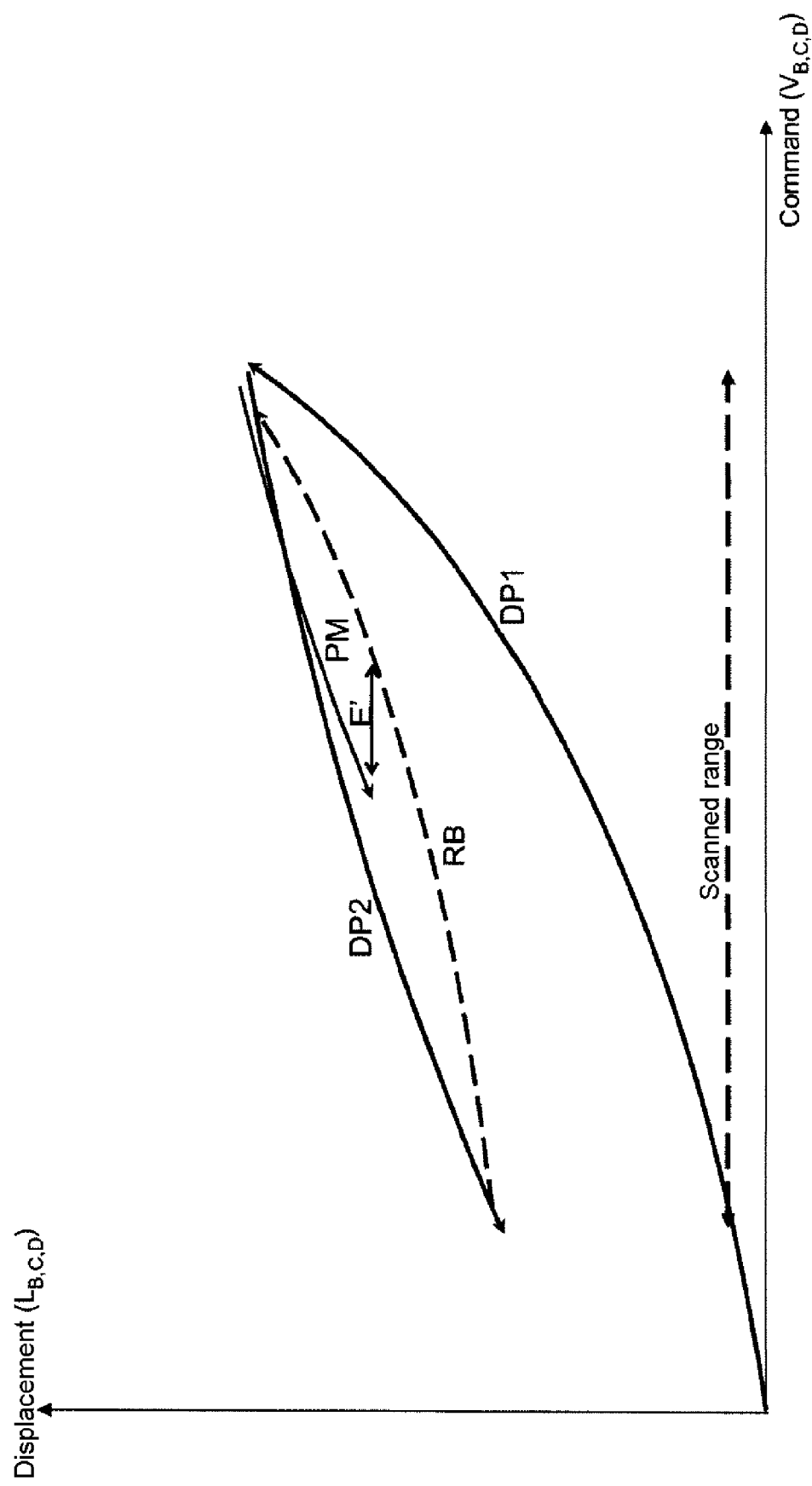
FIGS. 8 and 9 represent by two graphs illustrations of the mechanism for reducing the hysteresis in a laser gyrometer according to the invention.

FIG. 8 illustrates the case in which the ramp increases with a positive average value. The prior exploration of the intended range by the displacements DP1 and DP2 can make it possible to reduce the hysteresis of the mirror to a positioning error E'. The prior scan may be carried out by going through the range in a single direction followed by an increasing or decreasing ramp. The positioning error can then be reduced by about a factor of two. The range may also be traveled through fully in both directions, then followed by an increasing or decreasing ramp. The positioning error will be reduced by a factor of three to four. A plurality of scans in both directions may be carried out in order to reduce the positioning error to below a desired quantity. The proposed invention can thus make it possible to take into account the phenomenon of hysteresis in the positioning of the mobile mirrors, and reduce its influence.

After having shown how a preliminary ramp in the scanning range can make it possible to reduce the error between the target position and the position actually reached in the positioning range comprising ±λ/4 with respect to the median repositioning values, the point is now to show that the hysteresis can be reduced further with a more complex sequence. In order to improve the reproducibility throughout the final positioning range, it may be suitable to start the sequence with a pre-scan covering the extreme values of this range comprising ±λ/2 with respect to the median repositioning values. For example, the mirror commands may follow a ramp as far as the maximum value achievable for repositioning then return to the minimum, i.e. a variation of ±λ/2. The scan range extending over ±λ/4 may then be explored, for example by following an increasing ramp. Once the scan has been completed, the repositioning can have a further improved reproducibility if its initial state is comparable to that before the scan. Before controlling the repositioning, the mirrors may be driven again using a sequence comparable to that of the pre-scan, in order to bring them to the starting value of the pre-scan. For example, in the case in which the ramp increases with a positive average value, the sequence may be of the type illustrated in FIG. 9 in order to optimize the hysteresis reduction cycle. A displacement DP'1 carries out a forward pre-scan as far as the end of the full range, i.e. over ±λ/2. A displacement DP'2 carries out a return pre-scan as far as the start of the full range. A displacement DP'3 carries out positioning at the start of the scan range. A displacement DP'4 carries out a scan over ±λ/4. A displacement DP'5 carries out positioning at the end of the full positioning range. A displacement DP'6 returns to the start of this range. The mobile mirrors are then ready to receive their final command with a positioning error which is reduced because the setting up and the measurement ramp use the same side of the hysteresis cycle.

When starting the gyrolaser, the invention can therefore make it possible to position the three mobile mirrors simultaneously as close as possible to a gain maximum of the three cavities, irrespective of their intermodes, in intervals having selected amplitudes and with a desired precision. Once the positioning has been carried out, the autonomous cavity length slaving can be started. With its own convergence time constant, it makes it possible to set up the cavities more finely at their intensity maximum and keep them there. The point is now to show that it is advantageously possible to carry out a test at the end of the convergence time of the autonomous slaving in order to check proper running of the sequences according to the invention as described above. The command indications of the mirrors can be recorded at the end of the autonomous slaving convergence and compared with the intended range. The difference between the position of each mirror and the center of its positioning range can be calculated. Normally, these differences should not exceed one half of the intermode of the mirror. However, the measurement noise, the temperature variation of the intermode and the ageing may lead to this value being increased by an additional margin. In the case, for example, of controlling the mirrors as described in Equation 5, with the capacity of sampling the values $I_X$, $I_Y$ and $I_Z$ and driving the commands $D_X$, $D_Y$ and $D_Z$ by software, the commands of the mirrors may be determined by the equation $$\begin{bmatrix} V_C \\ V_D \\ V_B \end{bmatrix} = -A \begin{bmatrix} -1 & 1 & 1 \\ 1 & -1 & 1 \\ 1 & 1 & -1 \end{bmatrix} \begin{bmatrix} I_X + D_X \\ I_Y + D_Y \\ I_Z + D_Z \end{bmatrix}.$$

As explained above, the median commands $V_B^0$, $V_C^0$ and $V_D^0$ corresponding to the centers of the ranges may be estimated by the equation $$\begin{cases} V_B^0 = A[-D_X^0 - D_Y^0 + D_Z^0] \\ V_C^0 = A[D_X^0 - D_Y^0 - D_Z^0] \\ V_D^0 = A[-D_X^0 + D_Y^0 - D_Z^0]. \end{cases}$$

The difference between the commands $V_B$, $V_C$ and $V_D$ and the center of the respective range may be evaluated by $$\begin{cases} \Delta V_B = V_B - V_B^0 = -A[I_X + D_X - D_X^0 + I_Y + D_Y - D_Y^0 - I_Z - D_Z + D_Z^0] \\ \Delta V_C = V_C - V_C^0 = -A[-I_X - D_X + D_X^0 + I_Y + D_Y - D_Y^0 + I_Z + D_Z - D_Z^0] \\ \Delta V_D = V_D - V_D^0 = -A[I_X + D_X - D_X^0 - I_Y - D_Y + D_Y^0 + I_Z + D_Z - D_Z^0]. \end{cases}$$

Normally, the absolute value of these differences does not exceed the highest half-intermode of the mirrors $\Delta K/2$. By adopting an additional margin ms, and writing $\Delta K'=\Delta K/A$ and $\Delta B,C,D=\Delta V_{B,C,D}/A$, checking the relationships 17 below can make it possible to confirm that the operation point found during this test is consistent with the point obtained from the procedures of scanning, re-centering and prepositioning according to the invention:

$$\begin{cases} |\Delta B| = |I_X + D_X - D_X^0 + I_Y + D_Y - D_Y^0 - I_Z - D_Z + D_Z^0| < \\ \qquad (1+\text{ms}) \times \Delta K' \\ |\Delta C| = |-I_X - D_X + D_X^0 + I_Y + D_Y - D_Y^0 + I_Z + D_Z - D_Z^0| < \\ \qquad (1+\text{ms}) \times \Delta K' \\ |\Delta D| = |I_X + D_X - D_X^0 - I_Y - D_Y + D_Y^0 + I_Z + D_Z - D_Z^0| < \\ \qquad (1+\text{ms}) \times \Delta K' \end{cases} \quad (17)$$

In the converse case, if one of the differences exceeds the appointed limit, re-centering may be proposed again or a malfunction be declared. It may also be arranged that non-compliance with this test does not indicate a fault, and that the gyrometer may continue to be started with the result of the test being stored in memory.

The present invention also has the principal advantages that it avoids the problem of mode competition. Furthermore, by no longer making the implicit assumption of similar mechanical behavior of the mirrors as a function of temperature, the present invention allows greater tolerance for the differences in behavior between the mirrors. Fewer mirrors are consequently rejected at the end of the manufacturing line. The cost savings are not insignificant.

The invention claimed is:

1. A method for positioning three translatable mirrors in a laser gyrometer comprising three laser ring cavities, the positioning being carried out when starting the gyrometer, each of the three laser ring cavities comprising an optical amplifier medium which can be excited so as to generate light waves, an optical cavity formed by a set of mirrors including two of the translatable mirrors, the length of said optical cavity depending on the position of said two translatable mirrors, said two translatable mirrors being displaceable in ranges of positions imparting to the optical cavity lengths at which the amplifier medium generates at least one laser wave, each of the three translatable mirrors being used in the formation of two of the optical cavities, the method comprising:

a phase of prepositioning the three mirrors at an initial triplet of predetermined respective initial positions;

a phase of displacing the three mirrors simultaneously in translation in ranges having an equal amplitude less than or equal to a highest intermode in a plurality of intermodes of the optical cavity, so as to ensure that each of the optical cavities passes through a length at which the amplifier medium offers a gain maximum, intensities of the laser waves respectively traveling through each of the optical cavities being measured for each triplet of positions which are occupied by the mirrors, wherein said intermodes are related to variations in voltages within a particular mode of the laser gyrometer;

a phase of determining, on the basis of the three triplets of positions of the mirrors which respectively allowed each of the three cavities to offer a maximum intensity, the length of each of the three cavities at which said cavity provides a maximum intensity;

a phase of determining a single final triplet of positions of the mirrors making it possible simultaneously to impart to the three cavities lengths at which they provide a maximum intensity; and a phase of positioning the mirrors at the final triplet of positions.

2. The method as claimed in claim 1, wherein the initial triplet of positions of the three mirrors is extracted from a table collating with temperature values a triplet of positions of the three mirrors imparting respectively to each of the optical cavities a length at which the amplifier medium offers a gain maximum at said temperature.

3. The method as claimed in claim 1, wherein the amplifier media are gases which can be ionized by an electrical discharge.

4. The method as claimed in claim 1, wherein the device is a triple axis laser gyrometer.

5. The method as claimed in claim 1, wherein the three optical cavities have an equal intermode, and the displacement amplitude of the three mirrors is equal to half of said equal intermode.

6. The method as claimed in claim 1, further comprising a preliminary phase of scanning the three mirrors in ranges covering the displacement ranges of the mirror but without measuring the intensities of the wave, so as to reduce the hysteresis between the phase of displacing the mirrors and the phase of positioning the mirrors.

7. The method as claimed in claim 1, wherein the device further comprises an adjustment mechanism making it possible, on the basis of the final triplet of positions, to constantly adjust the positions of the translatable mirrors so as to ensure that the cavities have respective lengths allowing them to constantly provide a maximum intensity, and the method further comprises a final phase of comparing the final triplet of positions with a triplet of positions toward which the adjustment mechanism makes the mirrors converge after a given delay, the preceding phases of the method being repeated and/or the difference being stored in memory and/or the device being disabled if one of the mirrors is further away than a given threshold from the position which it had at the end of the positioning phase.

* * * * *

UNITED STATES PATENT AND TRADEMARK OFFICE
CERTIFICATE OF CORRECTION

| | | |
|---|---|---|
| PATENT NO. | : 8,493,566 B2 | Page 1 of 1 |
| APPLICATION NO. | : 12/919980 | |
| DATED | : July 23, 2013 | |
| INVENTOR(S) | : François Gutty et al. | |

It is certified that error appears in the above-identified patent and that said Letters Patent is hereby corrected as shown below:

On the Title Page

Item "(75) Inventors:"

Please Replace "Palalseau" with --Chatellerault--; and

Please Replace "Elienne" with --Etienne--.

Signed and Sealed this
Fifth Day of November, 2013

Teresa Stanek Rea
*Deputy Director of the United States Patent and Trademark Office*